United States Patent
Boillot et al.

(10) Patent No.: US 7,557,326 B2
(45) Date of Patent: Jul. 7, 2009

(54) LASER JOINING HEAD ASSEMBLY AND LASER JOINING METHOD

(75) Inventors: Jean-Paul Boillot, St-Bruno (CA); Adrian Bucur, Longueuil (CA); Jacques-André Gaboury, Montréal (CA); Jean-Claude Fontaine, Sainte-Foy (CA)

(73) Assignee: Servo-Robot Inc., St. Bruno (Quebec) (CA)

( * ) Notice: Subject to any disclaimer, the term of this patent is extended or adjusted under 35 U.S.C. 154(b) by 602 days.

(21) Appl. No.: 11/095,660

(22) Filed: Apr. 1, 2005

(65) Prior Publication Data
US 2005/0247681 A1    Nov. 10, 2005

(30) Foreign Application Priority Data
Apr. 2, 2004   (CA) .................................. 2463409
Mar. 31, 2005  (CA) ................. PCT/CA2005/00487

(51) Int. Cl.
*B23K 26/04* (2006.01)
*B23K 26/24* (2006.01)

(52) U.S. Cl. ............................ 219/121.63; 219/121.64; 219/121.78; 382/152; 356/237.1; 356/237.2

(58) Field of Classification Search ................................
219/121.63–121.64, 121.78–121.83; 382/141, 382/152, 153; 356/237.1, 237.2
See application file for complete search history.

(56) References Cited

U.S. PATENT DOCUMENTS

| | | | | |
|---|---|---|---|---|
| 4,001,543 A | * | 1/1977 | Bove et al. | 219/121.63 |
| 4,673,795 A | | 6/1987 | Ortiz, Jr. | |
| 4,840,483 A | * | 6/1989 | Haffner | 356/153 |
| 4,843,287 A | * | 6/1989 | Taft | 318/568.16 |
| 4,907,169 A | * | 3/1990 | Lovoi | 700/259 |
| 5,877,960 A | * | 3/1999 | Gross et al. | 700/175 |
| 6,297,471 B1 | | 10/2001 | Schubert | |
| 6,528,762 B2 | * | 3/2003 | Mayer | 219/121.83 |
| 6,596,961 B2 | | 7/2003 | Ehlers et al. | |
| 6,596,962 B2 | | 7/2003 | Haschke | |

(Continued)

FOREIGN PATENT DOCUMENTS

CA    2 323 803 A1    7/2000

(Continued)

OTHER PUBLICATIONS

Lindskog; "Seam Tracking Laser Welding Tool"; EALA 2002 Conference in Bad Nauheim, Germany; pp. 1-13.

*Primary Examiner*—Samuel M Heinrich
(74) *Attorney, Agent, or Firm*—McDermott Will & Emery LLP

(57) ABSTRACT

There are provided a laser joining head assembly and a laser joining method for simultaneously performing joint tracking and seam inspection of a joint while said joining head assembly is in relative motion along the joint. The laser joining head assembly comprises integrated tracking laser line projecting means and integrated inspection laser line projecting means for respectively projecting a tracking laser line and an inspection laser line on the joint, thereby allowing to respectively generate successive joint transverse profiles and seam transverse profiles. These profiles are processed to respectively provide joint data and seam data, thereby allowing to perform said joint tracking and said seam inspection of said joint during said motion.

44 Claims, 7 Drawing Sheets

U.S. PATENT DOCUMENTS

| | | |
|---|---|---|
| 6,614,002 B2 | 9/2003 | Weber |
| 6,621,047 B2 | 9/2003 | Kessler et al. |
| 6,670,574 B1 * | 12/2003 | Bates et al. ............ 219/121.64 |
| 6,683,976 B2 * | 1/2004 | Dulaney et al. ............. 382/151 |
| 6,909,799 B1 * | 6/2005 | Wildmann et al. .......... 382/152 |
| 7,107,118 B2 * | 9/2006 | Orozco et al. ............... 700/166 |
| 2005/0041852 A1 * | 2/2005 | Schwarz et al. ............. 382/152 |
| 2006/0157457 A1 * | 7/2006 | Sakurai et al. ......... 219/121.76 |
| 2008/0069445 A1 * | 3/2008 | Weber ........................ 382/181 |

FOREIGN PATENT DOCUMENTS

WO  WO 03/041902 A1  5/2003

* cited by examiner

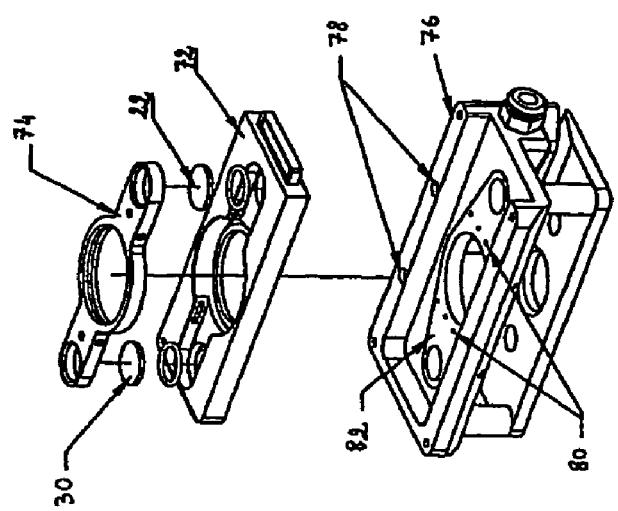
FIG. 4F
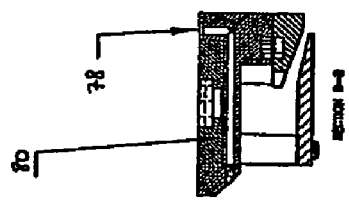
FIG. 4D
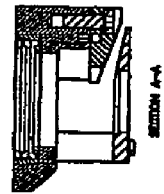
FIG. 4C
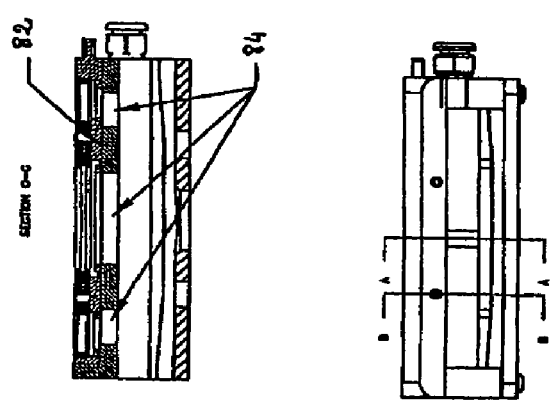
FIG. 4E
FIG. 4B
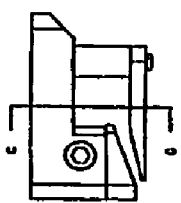
FIG. 4A

LASER JOINING HEAD ASSEMBLY AND LASER JOINING METHOD

FIELD OF THE INVENTION

The present invention generally relates to laser joining systems and methods and more particularly to laser joining systems and methods for performing a seam along a joint.

BACKGROUND OF THE INVENTION

In the manufacturing field, several applications require the use of laser joining systems for joining elements together. Mostly, for metallic elements, the current method is to join them with a seam by welding or brazing. Laser welding or brazing, or even laser cladding, use the energy of a focused high power laser beam on a very small area to melt the edge of the joint or heat it.

Whichever joining technique is utilized, in many applications, overall dimensions, positions and tolerances of the parts to be welded are so precise that the joint can be joined without a seam tracking system. In others cases, welding a joint on an automated production line basis, for example, requires to automate the process, specially for car roof welding applications. In order to automate the process, a control and monitoring system is necessary to minimize the rejected parts due to defects associated with the erroneous position of the focal point of the high-power laser beam with respect to the workpiece and other variables. For example, one can use a tracking sensor to locate and follow the joint and then to positionally control the application of the laser heat source during relative motion of the joint and the welding system. In the case of laser joining, the tracking sensor must continuously resolve the joint location with high precision, as the laser beam impinging on the joint may be focused down to a diameter as small as 0.25 mm or less.

Contact tracking sensors have been used for this purpose but they are subjected to wear and other problems which generally lead to reliability issues. Therefore, non-contact tracking sensors have been preferred.

Non-contact tracking sensors based on the use of laser have thus been envisaged. For example, known in the art, there is a seam tracking laser welding tool proposed by Permanova Lasersystem AB which is described in an article from A. Lindskog entitled <<Seam Tracking Laser Welding Tool>>. As disclosed therein, a laser beam projects a tracking laser line at a suitable angle to the surface to be profiled. The reflected light from the laser line is observed along a line of sight normal to the surface and is conveyed to an optical sensor extending coaxially along the optical axis of the laser. The elevation of the observed linear surface can be determined by optical triangulation. From this can be obtained a precise profile of the observed linear surface in the field of view of the optical sensor, which lies in a viewing plane normal to the surface. The optical sensor response can then be processed to provide, in essence, a sectional view indicating surface profile.

It is well known in the art that resolving a joint of minute lateral dimensions and accurately tracking it while moving at acceptable speeds is a difficult task. Moreover, the tracking sensor must allow controlling the laser welding beam such that it is both vertically and laterally aligned with the joint. The previously described device, which uses conventional CCD optical sensors, performs conveniently this tracking task but can not provide fast speed and accuracy required by some applications. Furthermore, it is bulky and requires adjustments of the laser projectors.

Besides, once a joint has been made, it would be desirable to perform an inspection of the seam in order to ensure the joint has been correctly made. Therefore, it would be desirable to provide a tracking, joining and inspection system able to simultaneously perform the tracking, the joining and the inspection of the joint to be processed. It would also be even more desirable to provide such a system which would be able to perform adaptive process control such as process speed or laser power as non limitative examples.

In the art, there are provided tracking and inspection systems, but they are not able to deal with curvilinear joints while welding using high power laser without using cumbersome rotating devices that prevent the vision system to view close to the processing area. This situation causes two major constraints. Firstly, the necessary space of all required devices to execute all these tasks is too large for easy access to the part without creating mechanical interference or colliding with the tooling or work piece. Moreover, the distance between the process point and the inspection point is too large to enable high accuracy of measurement and quick control action.

Known in the art, there is also U.S. Pat. Nos. 6,614,002; 6,621,047 and 4,673,795 but none of them disclose a tracking, joining and inspection system able to simultaneously perform the tracking, the joining and the inspection of the joint while being fast and accurate.

It would therefore be desirable to provide a device that incorporates in a compact assembly all the necessary elements to perform the tracking, the joining and the inspection of the joint to be processed while providing a fast processing speed.

SUMMARY OF THE INVENTION

An object of the present invention is to provide a laser joining head assembly and a laser joining method that satisfies the above mentioned needs.

Accordingly, the present invention provides a laser joining head assembly for simultaneously performing joint tracking and seam inspection of a joint while the joining head assembly is in relative motion along the joint. The laser joining head assembly is provided with a joining laser beam directed towards the joint along a joining laser optical path. The laser joining head assembly is also provided with integrated tracking laser line projecting means having an optical axis precisely angularly directed towards the joint closely frontwards the joining laser beam with respect to the relative motion for projecting a tracking laser line transversally intersecting the joint, thereby allowing to generate successive joint transverse profiles. The laser joining head assembly is also provided with integrated inspection laser line projecting means having an optical axis precisely angularly directed towards the joint closely backwards the joining laser beam with respect to the relative motion for projecting an inspection laser line transversally intersecting the joint, thereby allowing to generate successive seam transverse profiles. The laser joining head assembly also has imaging means mounted coaxially to the joining laser beam for successively imaging each of the joint transverse profiles and each of the seam transverse profiles coaxially through the joining laser optical path during the motion. The laser joining head assembly is also provided with processing means operatively connected to the imaging means for processing the joint profiles and the seam profiles to respectively provide joint data and seam data, thereby allowing to perform the joint tracking and the seam inspection of the joint during the motion.

In a preferred embodiment of the invention, the laser joining head assembly is further provided with rotating means mounting each of the laser line projecting means for synchronously rotating each of the projecting means with each other around the joining laser beam, thereby allowing to deal with curvilinear joints.

According to another aspect of the invention, there is provided a laser joining method for simultaneously performing joint tracking and seam inspection of a joint. The method comprises the steps of:

providing a joining head in relative motion along the joint and having a joining laser beam directed towards the joint along a joining laser optical path;

projecting a tracking laser line transversally intersecting the joint closely frontwards the joining laser beam with respect to the relative motion to generate successive joint transverse profiles;

projecting an inspection laser line transversally intersecting the joint closely backwards the joining laser beam with respect to the relative motion to generate successive seam transverse profiles;

imaging each of the joint transverse profiles and each of the seam transverse profiles coaxially through the joining laser optical path; and processing the joint profiles and the seam profiles to respectively provide joint data and seam data, thereby allowing to perform the joint tracking and the seam inspection of the joint during the motion.

In a preferred embodiment of the method of the present invention, the method allows to perform an adaptive process control.

BRIEF DESCRIPTION OF THE DRAWINGS

These and other objects and advantages of the invention will become apparent upon reading the detailed description and upon referring to the drawings in which:

FIG. 4A is a side view of the nozzle and the protective lenses of the protecting assembly of the laser joining head assembly of the present invention.

FIG. 4B is a front view of the nozzle and the protective lenses of the protecting assembly shown in FIG. 4A.

FIG. 4C is a cross sectional side view of the nozzle and the protective lenses of the protecting assembly taken along line A-A of FIG. 4B.

FIG. 4D is another cross sectional side view of the nozzle and the protective lenses of the protecting assembly taken along line B-B of FIG. 4B.

FIG. 4E is another cross sectional side view of the nozzle and the protective lenses of the protecting assembly taken along line C-C of FIG. 4A.

FIG. 4F is an exploded perspective view of the nozzle and the protective lenses of the protecting assembly shown in FIG. 4A.

Figure 1B:
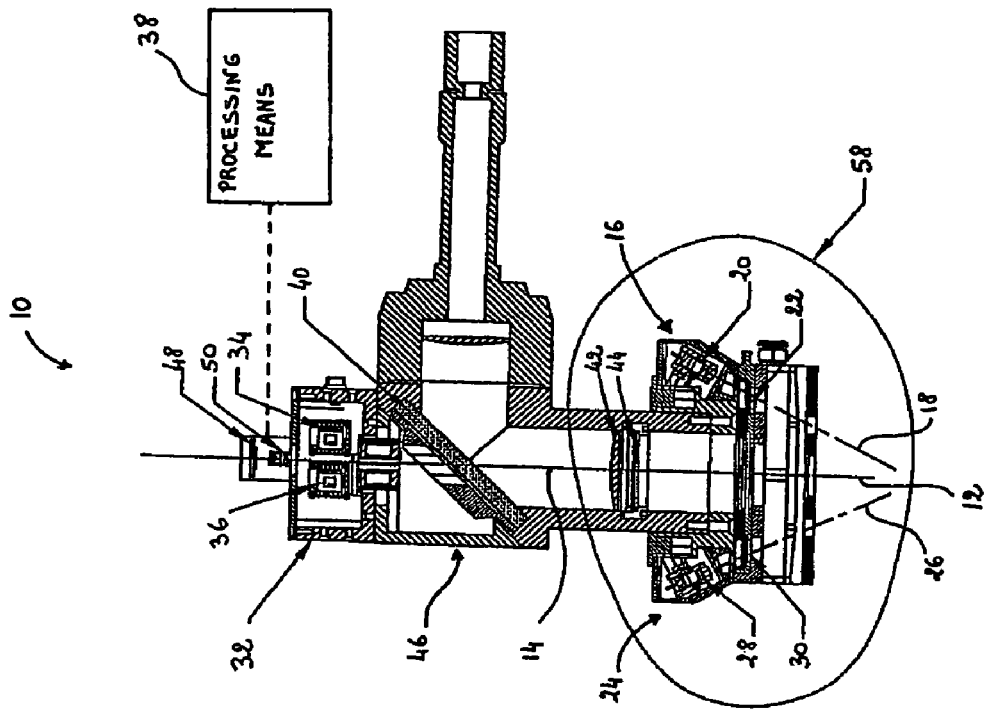
FIG. 1B is a cross sectional view of the laser joining head assembly shown in FIG. 1A.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

In the following description, similar features in the drawings have been given similar reference numerals and in order to weight down the figures, some elements are not referred to in some figures if they were already identified in a precedent figure.

The present invention concerns a laser joining head assembly for joining metallic elements along a joint while allowing to simultaneously perform joint tracking and seam inspection while the joining head assembly is in relative motion along the joint. The laser joining head assembly can be a welding head for welding the joint with or without a filler wire or even with a filler powder or a brazing head for brazing the joint with a filler wire. Moreover, throughout the present description, the expression <<seam>> is to be understood to designate the weld bead of the joint once it has been welded or brazed.

The laser joining head assembly of the present invention is provided with a joining laser beam which is controlled to automatically track the joint while moving at a relatively high velocity. Indeed, the laser joining head assembly is provided with a complete control and monitoring system that will correct for any error in position and fit-up of the parts to be processed and for errors in the programmed laser beam trajectory and laser parameters by the use of an integrated 3-D vision system using optical triangulation method. After the process point, another integrated 3-D vision system, also based on the triangulation method, is also used to validate the quality of the result of the process, bond or joint. The complete process area can advantageously be viewed and monitored through a coaxial vision channel, as will be further detailed thereinafter.

The laser joining head assembly of the present invention is particularly well adapted to be convenient to implement, flexible in operation and insensitive to environmental influences while being capable of precision joining a joint having relatively small transverse dimensions at a high speed.

Figure 1A:
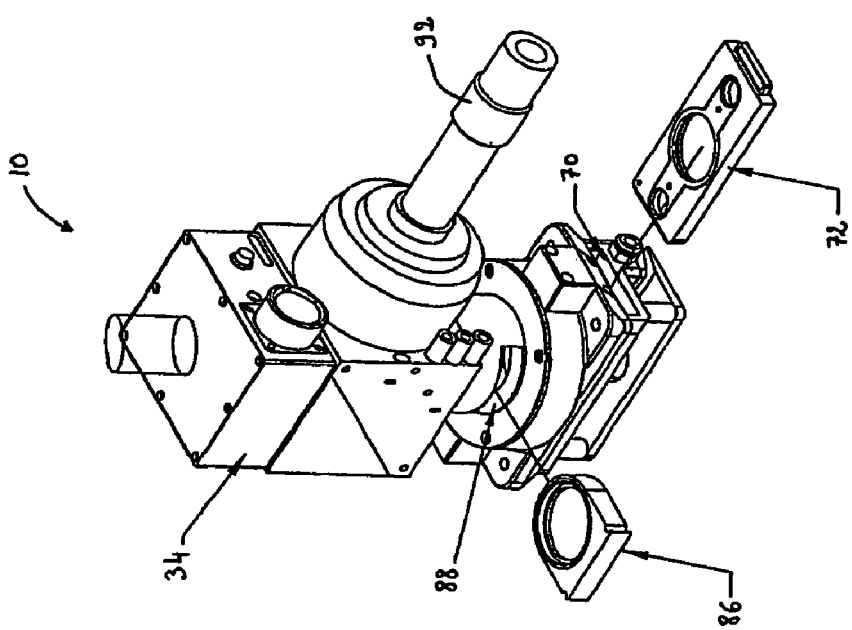
FIG. 1A is a partially exploded perspective view of a laser joining head assembly according to the present invention.
Figure 2C:
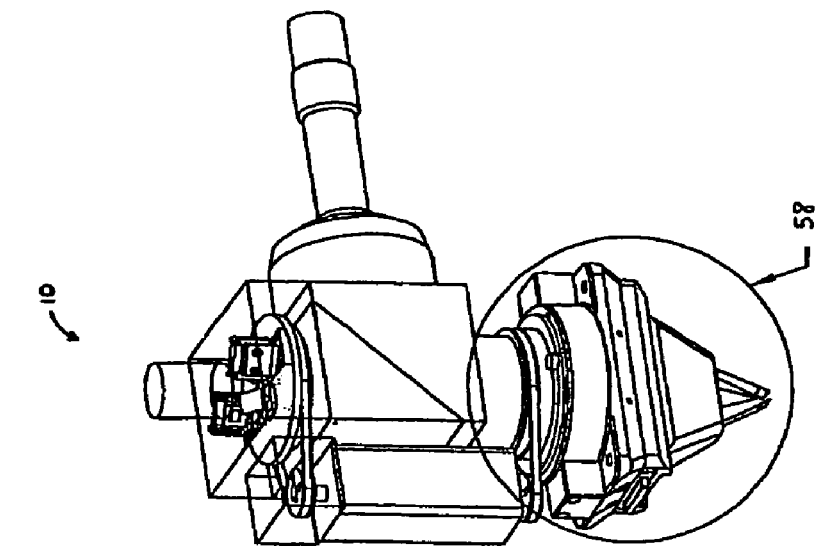
FIG. 2C is another perspective view of the laser joining head assembly shown in FIG. 2A.
Figure 2B:
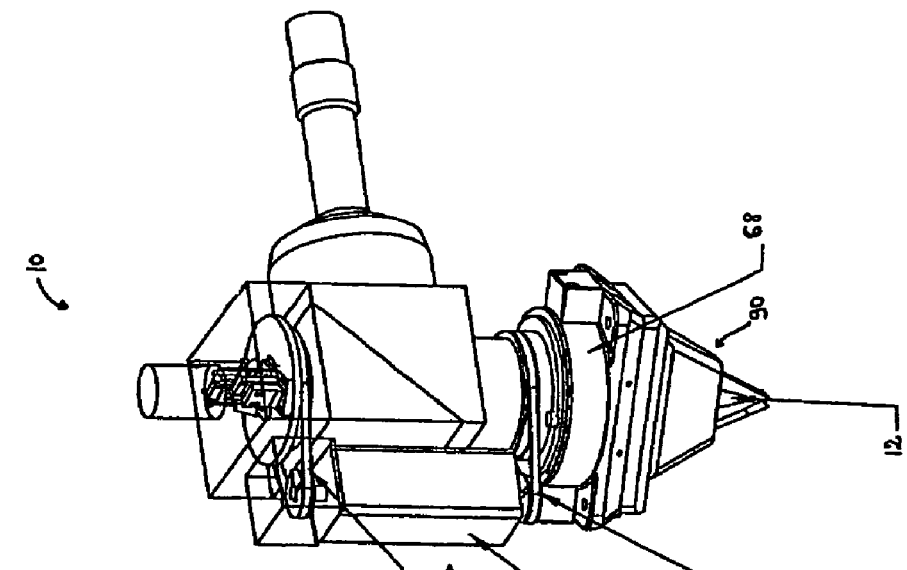
FIG. 2B is another perspective view of the laser joining head assembly shown in FIG. 2A.
Figure 2A:
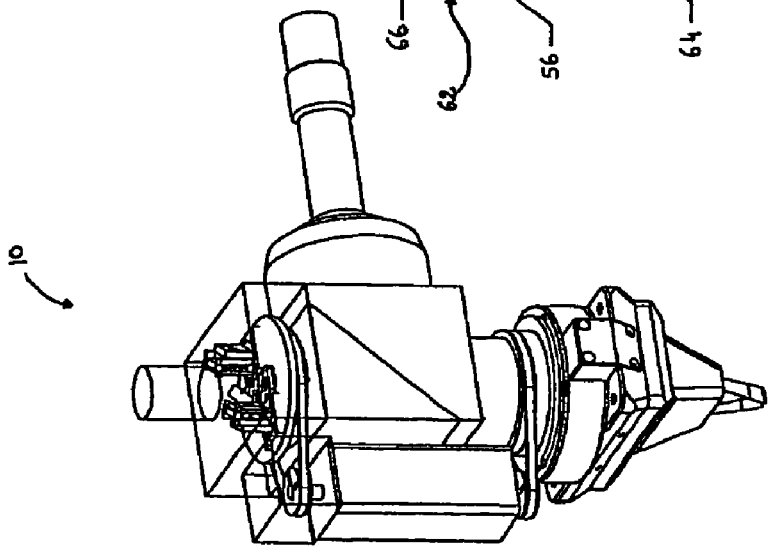
FIG. 2A is a perspective view of another laser joining head assembly according to the present invention.

Referring to FIGS. 1A and 1B, there is shown a laser joining head assembly 10 according to a preferred embodiment of the present invention. The laser joining head assembly 10 which is illustrated is a welding head but it should be understood that the present invention could also apply to a brazing head, as will be further described thereinafter. The laser joining head assembly 10 is provided with a joining laser beam 12 directed towards the joint (not shown) along a joining laser optical path 14. The laser joining head assembly 10 is also provided with integrated tracking laser line projecting means 16 having an optical axis 18 angularly directed towards the joint closely frontwards the joining laser beam 12 with respect to the relative motion for projecting a tracking laser line transversally intersecting the joint, thereby allowing to generate successive joint transverse profiles. Preferably, the tracking laser line projecting means 16 comprise a laser light generator 20 which projects the laser line through a protective lens 22. More preferably, the laser light generator 20 is provided with a solid state laser diode which emits red light. The laser joining head assembly 10 is also provided with integrated inspection laser line projecting means 24 having an optical axis 26 angularly directed towards the joint closely backwards the joining laser beam 12 with respect to the relative motion for projecting an inspection laser line transversally intersecting the joint, thereby allowing to generate successive seam transverse profiles. Preferably, the inspection laser line projecting means 24 comprise a laser light generator 28 which projects the laser line through a protective lens 30. More preferably, the laser light generator 28 is provided with a solid state laser diode which emits infra-red light in order to minimize the influence of the radiation of the joining laser beam thereon. It should however be understood that any other convenient laser light generator could also be used for each of the laser line projecting means 16, 24. In the present description, the expression "laser" is used throughout. It should however be noted that any other convenient energy source providing an energy line sufficiently strong and narrow could also be envisaged and is believed to be within the scope of the present invention.

The laser joining head assembly 10 is also provided with imaging means 32 mounted coaxially to the joining laser beam 12 for successively imaging each of the joint transverse profiles and each of the seam transverse profiles coaxially through the joining laser optical path 14 during the motion. Preferably and as illustrated, the imaging means 32 advantageously have a tracking 2D imager 34 for imaging the joint transverse profiles and an inspection 2D imager 36 for imaging the seam transverse profiles. More preferably, each of the 2-D imagers 34, 36 is provided with a CMOS sensor, which is more compact and faster than the CCDs generally used in the prior art, thereby allowing to reach very fast joining speed. The laser joining head assembly 10 of the present invention is also provided with processing means 38 operatively connected to the imaging means 32 for processing the joint profiles and the seam profiles to respectively provide joint data and seam data, thereby allowing to perform the joint tracking and the seam inspection of the joint during the motion.

Indeed, during the relative motion of the head assembly 10 with respect to the joint to be processed, each of the laser light generators 20, 28 projects a plane of laser light at an angle, respectively in front and behind the joining laser beam 12. The intersection of these planes with the joint respectively produces the tracking laser line and the inspection laser line. Inside the imaging means 32, the tracking 2-D imager 34 detects the tracking laser line, preferably through a semi-reflective mirror 40, a focusing lens 42 and a protective lens 44. The inspection 2-D imager 36 detects the inspection laser line, preferably through the semi-reflective mirror 40, the focusing lens 42 and the protective lens 44. The laser light generator 20 and the tracking 2-D imager 34 are thus able to measure the depth profile along the tracking laser line, using the well known optical triangulation principle. This depth profile provides geometric information about the joint. This information can then be advantageously used by the processing means 38 to provide the joint tracking and monitoring, and adaptive process control functions. The laser light generator 28 and the inspection 2-D imager 36 are thus able to measure the depth profile along the inspection laser line, also using the well known optical triangulation principle. This depth profile provides geometric information about the seam. This information can then be advantageously used by the processing means 38 for inspection, quality control and adaptive welding control based on seam shape or joint geometry.

It is worth mentioning that each of the tracking laser line projecting means 16 and the inspection laser line projecting means 24 can advantageously be symmetrically arranged with respect to the joining laser beam 12 for projecting each one of the laser lines in a symmetric relationship with respect to the joining laser beam 12. Thus, the functions of the tracking module and the inspection module can then advantageously be exchanged to reverse the processing direction without requiring to rotate the projecting means 16, 24 nor the imaging means 32. Then, the information provided by the laser light generator 20 and the tracking 2-D imager 34 can be advantageously used by the processing means 38 to provide the joint tracking and monitoring, and adaptive process control functions or for inspection, quality control and adaptive welding control based on seam shape depending on the travel direction of the head assembly 10. Similarly, the information provided by the laser light generator 28 and the inspection 2-D imager 36 can advantageously be used by the processing means 38 for inspection, quality control and adaptive welding control based on seam shape or to provide the joint tracking and monitoring, and adaptive process control functions depending on the travel direction of the head assembly 10.

To perform these above mentioned functions, the processing means 38 may advantageously have a real time electronic processor contrary to the prior art devices which generally rely on frame grabbers, which are slower than the real time electronic processor used in the present invention. Moreover, the processing means 38 may also advantageously comprise measuring means for measuring a depth profile along each of the laser lines for providing geometric data about the joint and the seam. Furthermore, the processing means 38 can preferably also have monitoring means for monitoring position of the head assembly 10 relatively to the joint, and adaptive process control means for controlling the position of the head assembly 10 relatively to the joint. To perform the horizontal tracking of the joint and also the vertical tracking, the laser joining head assembly 10 is advantageously further provided with positioning means for continuously positioning the head assembly 10 and the joint relatively to each other along a focusing Z-axis and a lateral Y-axis. Preferably, the positioning means have a Y-actuator and a Z-actuator mounted on the wrist of the robot on which the head assembly 10 is mounted. Preferably, each of the actuators is a linear actuator. With this advantageous configuration, the incident angle of the joining laser beam 12 remains unchanged. The use of the Z-linear actuator allows to enable non-contact control of the focal point position of the joining laser beam 12, which is essential to maintain the spot size of the joining laser beam 12 impinging on the joint. This is a net improvement over the devices of the prior art which generally use a Y-tilting mechanism to move the laser spot, since the beam angle can not remain constant. This can lead to possible negative consequences on the welding quality. Alternatively, the head assembly 10 of the present invention can also be directly mounted to an articulated robot or machine without the use of linear axes if those machines have the necessary precision and speed requirement.

Figure 7B:
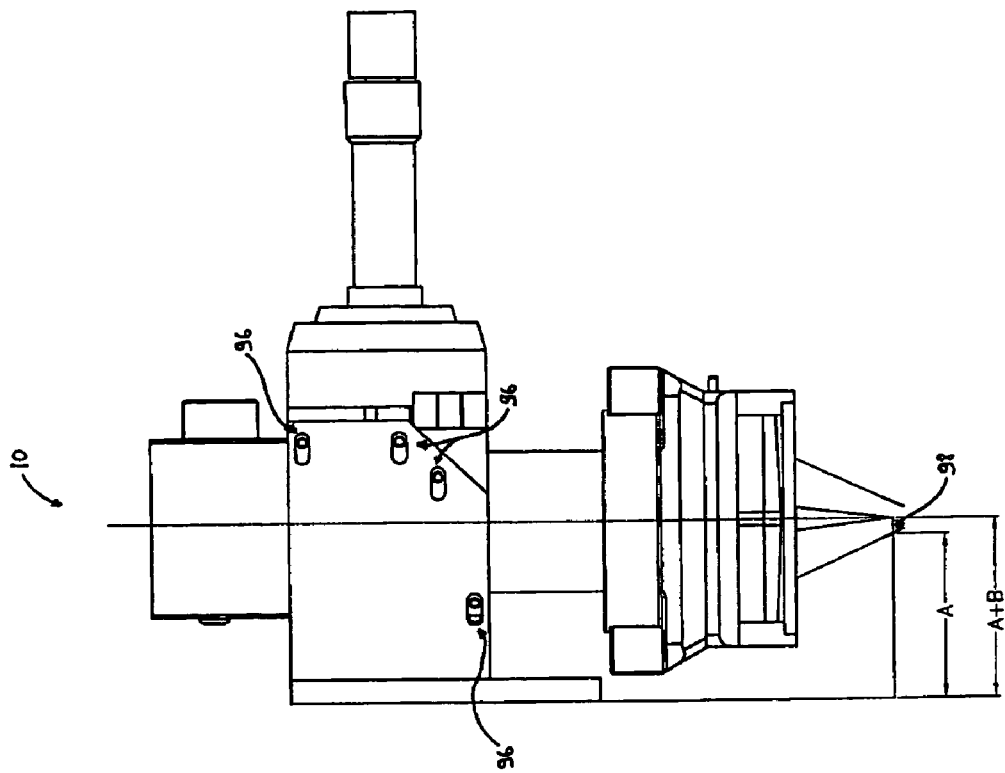
FIG. 7B is a side view of the laser joining head assembly of FIG. 7A, the assembly being in a predetermined position.
Figure 7A:
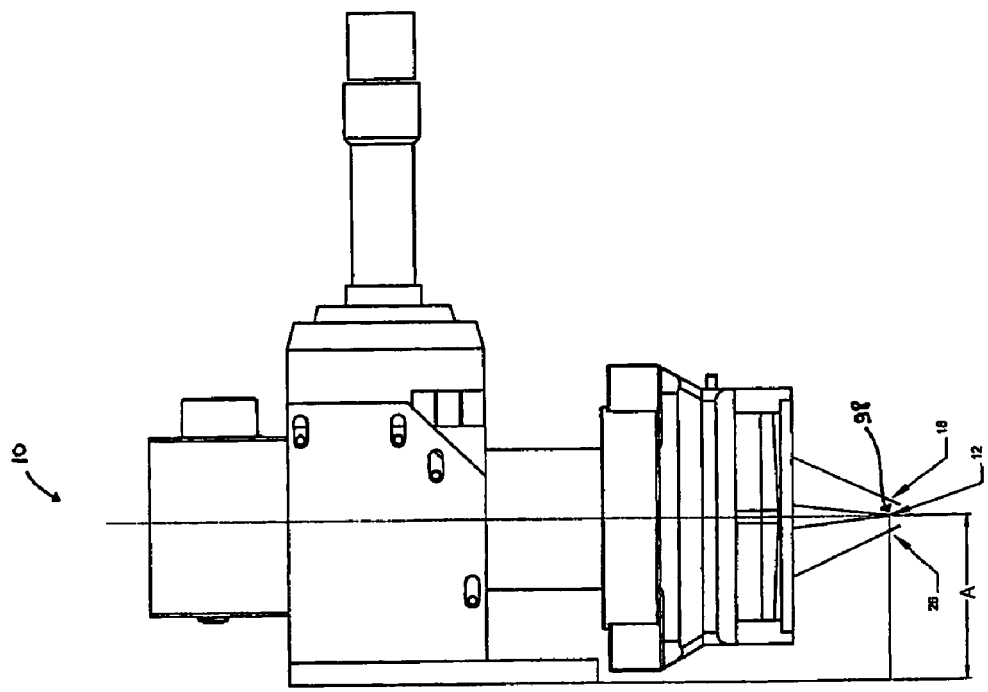
FIG. 7A is a side view of another laser joining head assembly, according to the present invention.

Moreover, with reference now to FIGS. 7A and 7B, the head assembly 10 of the present invention is particularly advantageous since it can perform compensation for robot inaccuracy. The devices proposed in the prior art generally do not mention this issue. In fact, they locate the tracking laser line very close to the tool center point of the head assembly 10. However, it is believed that it will only work for straight line line joint. On the contrary, in the present invention, the laser joining head assembly 10 may further advantageously comprise laser line translating means 96, preferably a slide, for translating a corresponding one of the optical axes 18, 26 of the corresponding laser line on an intersection of the joining laser beam 12 with the joint. This advantageous feature of the present invention enables looking directly at the tool center point 98 by translating one of the laser lines, thereby allowing to conveniently verify the exact position of the robot tool center point 98 to be able to take its position error into consideration. Indeed, FIG. 7A shows the head assembly 10 in a working position while FIG. 7B shows the head assembly 10 in a calibration position. As can be seen in the working position illustrated in FIG. 7A, the joining laser beam 12 intersects the joint at the tool center point 98 while each of the lines is projected on both sides of this point 98. In the calibration position illustrated on FIG. 7B, the optical axis 26 has been translated to directly look at the tool center point 98. This advantageous feature also allows to perform spot marking, or in other words, calibration of the spot to the tool center point or to the joint. This can be very useful for detecting the focal point position. To do this, one can perform a low power shot of the laser beam 12 onto a suitable part to mark out the position of the laser beam 12. Indeed, the low power shot provides a linear track onto the part. Then, each of the 2-D imagers 34, 36 can image the track to automatically deduce the Y position of the laser beam with respect to the 2-D imagers 34, 36. The X position can be deduce with an additional 2D imager 48, which will be described thereinafter with reference to FIGS. 3A and 3B.

Referring again to FIGS. 1A and 1B, preferably, the laser joining head assembly 10 is further provided with a casing 46 for mounting each of the projecting means 16, 24 and the imaging system 32 integrated with each other. Thus, the integration of the 3-D vision systems in the laser joining head assembly 10 reduces the size of the complete device, compared to a standard laser joining head equipped with external 3-D vision systems for joint tracking or seam inspection, thereby enabling easy access to the work piece and making the device easy to integrate with a robot or an automatic machine. Moreover, with this integration, neither the imaging means 32 nor the projecting means 16, 24 require adjustment and the laser lines can be located closer to the focal point of the joining laser beam 12, thus reducing the errors in the evaluation of the position of the focal point relative to the position of the joint and allowing tracking, inspection, adaptive welding control, etc. on complex curved work pieces. Of course, as an alternative, only one laser line can be projected. If only the tracking laser line is projected, only the 2-D imager 34 is necessary to detect this laser line. If only the inspection laser line is projected, only the 2-D imager 36 is necessary to detect this laser line. In this case, a single inspection or a single tracking is performed.

Figure 3B:
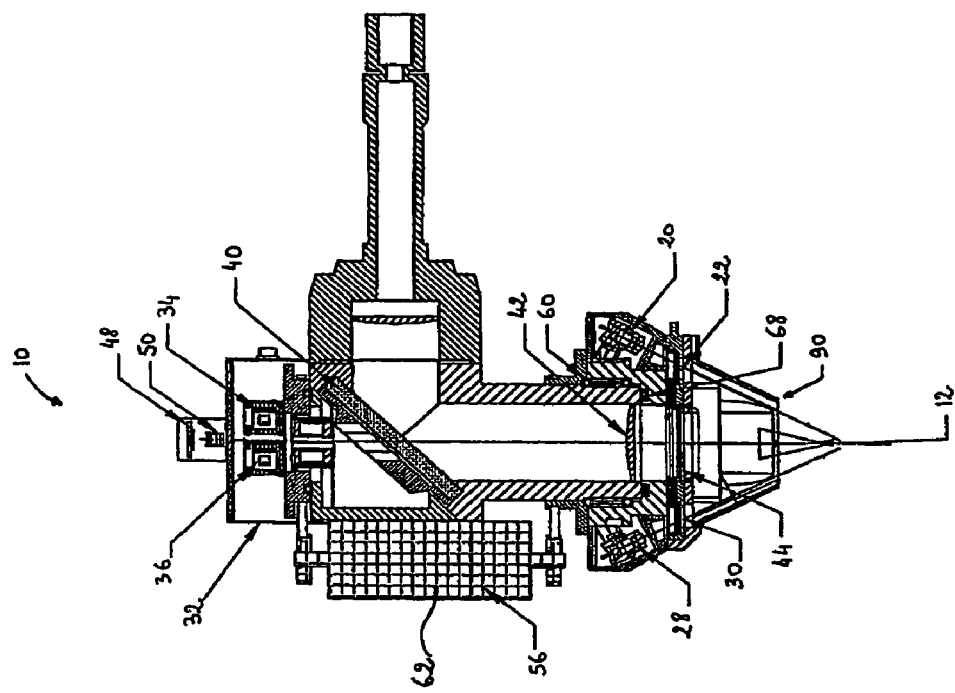
FIG. 3B is a cross sectional view of the laser joining head assembly shown in FIG. 3A.
Figure 3A:
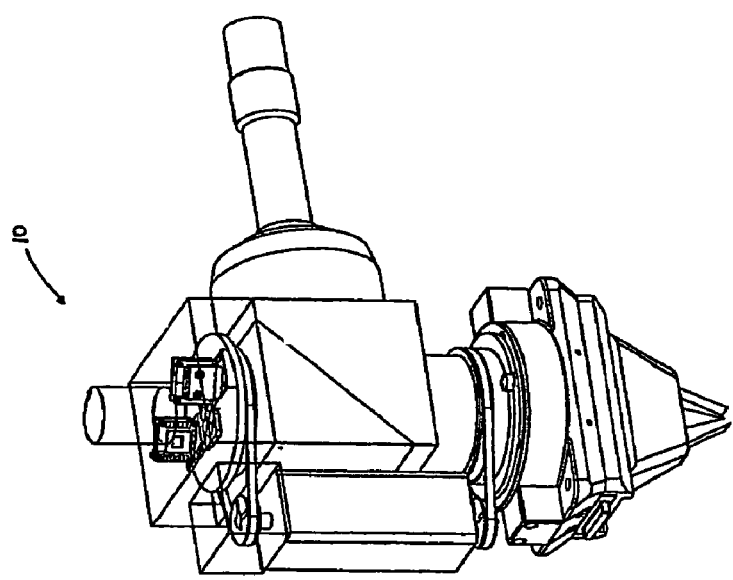
FIG. 3A is a perspective view of another laser joining head assembly according to the present invention.

Referring now to FIGS. 3A and 3B and also still to FIG. 1B, the imaging means 32 may advantageously be further provided with a process 2-D imager 48, preferably a CMOS sensor, for imaging a process area of the joint which extends between the tracking and inspection laser lines. In this case, the process 2-D imager 48 extends coaxially to the optical path 14 of the joining laser beam 12, the tracking and inspection 2D imagers 34, 36 extending on either respective side of the process 2-D imager 48. This 2D imager 48 is thus able to detect the complete process area, preferably through a lens 50, and coaxially through the optical path 14 of the joining laser beam 12. The complete process area which can be imaged includes the area in front of the molten material, the surface of the molten material itself and the solidified area behind the molten material. The information from this process 2D imager 48 can then advantageously be used for monitoring and control of the process laser source for adaptive process control, including process speed, laser beam weaving, etc.

Figure 5B:
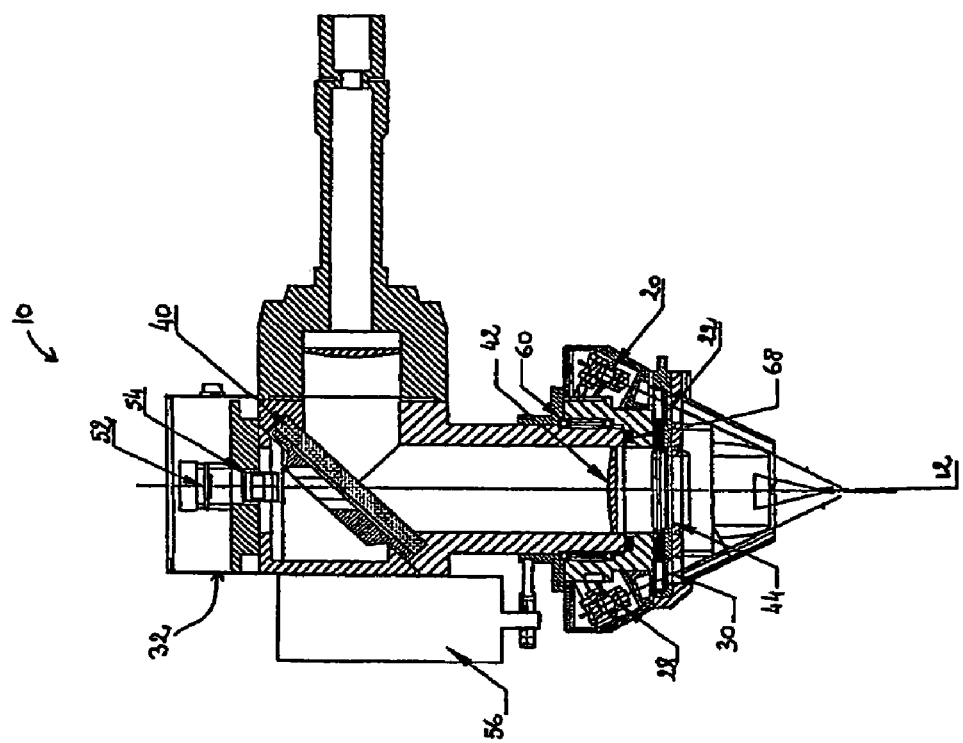
FIG. 5B is a cross sectional view of the laser joining head assembly shown in FIG. 5A.
Figure 5A:
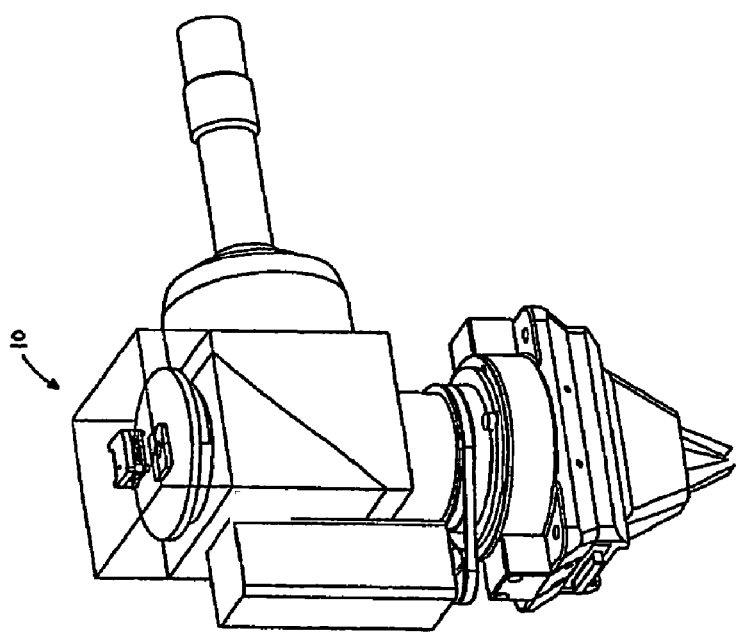
FIG. 5A is a perspective view of another laser joining head assembly according to the present invention.

Alternatively, with reference now to FIGS. 5A and 5B, in another preferred embodiment of the present invention, the imaging means may be provided with a single 2D imager 52, preferably a CMOS sensor, for imaging a process area of the joint surrounding the joint transverse profile and the seam transverse profile within a single image. In this case, the 2-D imager 52 still extends coaxially to the optical axis of the joining laser beam 12. This 2-D imager 52 is thus able to detect the complete process area, preferably through a lens 54, and coaxially through the optical path 14 of the joining laser beam 12. The complete process area which can be imaged includes the area in front of the molten material, the surface of the molten material itself, the solidified area behind the molten material and each of the tracking and inspection laser lines. As previously, the information from this 2-D imager 52 can then advantageously be used for tracking of the joint and inspection of the seam and also for monitoring and control of the process laser source for adaptive process control, including process speed, laser beam weaving, as non-limitative examples.

Referring now to FIGS. 2A to 3B, the laser joining head assembly 10 is preferably further provided with rotating means 56 mounting each of the laser line projecting means 16, 24 for synchronously rotating each of the projecting means 16, 24 with each other around the joining laser beam 12. More preferably, the rotating means 56 also mount the imaging means 32 for rotating the imaging means 32 synchronously with each of the projecting means 16, 24. Indeed, in a preferred embodiment, the laser light generators 20, 28, and the protective lenses 22, 30, which define a rotating assembly 58, can be installed on a bearing 60 to rotate around the joining laser beam axis 14. In this case, a double-shaft motor 62 is advantageously linked with the assembly 58 through a first timing belt 64 and with the imaging means 32 through a second timing belt 66. This arrangement rotates the assembly 58 and the imaging means 32 synchronously. A digital encoder 68 can advantageously provide the angular position of the rotating means 56. The rotation of the assembly 58 and the imaging means 32 advantageously allows parts with small joint radius to be processed and inspected continuously at high speed. Of course, any other suitable rotating means allowing rotation of each of the projecting means 16, 24 with each other around the joining laser beam 12 could also be envisaged.

Referring again to FIGS. 5A and 5B, if only one 2-D imager 52 is used to detect the two laser lines, it would also be possible to rotate only the assembly 58, keep the 2-D imager 52 fixed and process the information from the 2-D imager 52 in order to compensate for the rotation of the laser lines.

Still with reference to FIGS. 5A and 5B and also to FIGS. 2A to 3B, as previously described, each of the tracking laser line projecting means 16 and the inspection laser line projecting means 24 can advantageously be symmetrically arranged with respect to the joining laser beam 12 for projecting each one of the laser lines in a symmetric relationship with respect to the joining laser beam 12. Thus, the functions of the tracking module and the inspection module can then advantageously be exchanged to reverse the processing direction without rotating the assembly 58. However, in a preferred embodiment, the laser lines extend parallel to each others around the joining laser beam 12. The tracking laser line extends close to the joining laser beam 12 while the inspection laser line extends slightly away from the joining laser beam 12 in order to prevent the radiation of the joining laser beam 12 to perturb the imaged inspection laser line.

Referring now to FIGS. 1A, 1B and 4A to 4F, the laser joining head assembly 10 can advantageously be further provided with protecting means mountable in the casing 46 for protecting the focusing lens 42. The protecting means preferably have a main protective lens 44 coaxially disposed along the axis of the joining laser beam 12 and first and second protective lenses 22, 30 respectively disposed along the optical axis of a corresponding one of the projecting means 16, 24. As shown in FIG. 1, in a preferred embodiment, the assembly 58 preferably has a slot 70 into which a cartridge 72 slides. This cartridge 72 advantageously contains the protective lenses 22, 30. A lens cover 74 holds the lenses 22, 30 in place. The cartridge holder 76 has gas channels 78 that bring pressurized gas through the holes 80 into a cavity 82. The compressed gas fills the cavity 82 below the cartridge 72 and exits through the openings 84. The protecting means can also advantageously have a second cartridge 86 that contains the protective lens 44 and that slides into a slot 88. The protective lens 44 advantageously prevents the welding fumes and metallic projections from reaching the focusing lens 42.

As illustrated in FIGS. 3A and 3B, an alternate nozzle configuration can also advantageously be used. In this preferred embodiment, the main function of this nozzle 90 is to extend the protection in front of the disposable protective lenses 22, 30. The pressurized gas flow prevents the welding fumes from reaching the protective lenses 22, 30. The nozzle 90 covers the joining laser beam 12 and the planes of laser light generated by the corresponding laser light generators 20, 28 without causing any interference. The joining laser beam 12 and the two planes of laser light are then protected from spatters and fumes with a single element.

Figure 6:
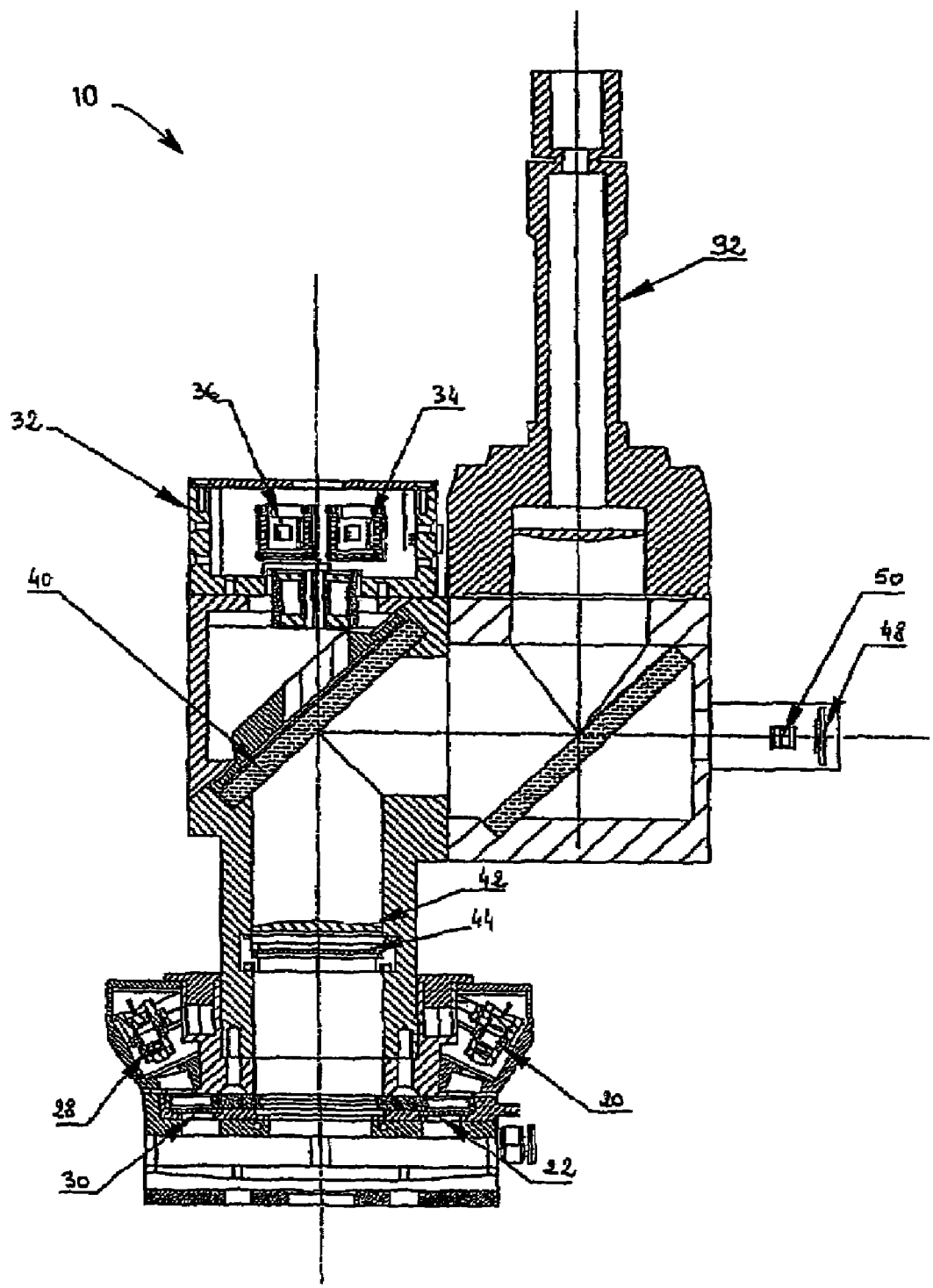
FIG. 6 is a cross sectional view of another laser joining head assembly, according to the present invention.

In the preferred embodiments previously described, the laser joining head assembly 10 preferably has a fiber coupling means 92 which advantageously extend perpendicularly with respect to the joining laser optical path 14. The fiber coupling means 92 is preferably provided with a semi reflective mirror 40 which is angularly disposed in the joining laser optical path 14. Alternatively, referring now to FIG. 6, the fiber coupling means 92 can also extend in a parallel relationship to the joining laser optical path. In this case, the fiber coupling means 92 may advantageously be provided with a first and a second semi reflective mirror 40, 94, the first mirror 40 being angularly disposed in the joining laser optical path. This alternate configuration advantageously reduces the obstruction caused by the fiber that brings the joining laser light into the laser joining head assembly 10. In this configuration, the 2-D imager 48 can preferably be positioned on the side of the fiber coupling means 92 instead of being positioned on the top of the assembly 10.

As previously detailed, the laser joining head assembly 10 can be a welding head provided with or without a filler wire or even with a filler powder. The head assembly 10 can also be a brazing head for brazing the joint. In this case, the joining head assembly 10 is provided with a filler wire. Without the filler, the tracking laser line and the inspection laser line can advantageously be used for adaptive control. When a filler wire is present, only the inspection laser line is preferably used for adaptive control to measure the seam and so control the inflow of the filler wire, since this filler wire is usually in front of the joining laser beam 12. In this case, the tracking laser line can advantageously be used to detect the position of the wire in front of the joining laser beam to optimize its position. Thus, the processing means 38 may advantageously be provided with a filler wire or powder controlling means for controlling the inflow of the filler wire or powder according to the data, thereby providing a real time adaptive joining.

According to another aspect of the present invention, there is also provided a laser joining method for simultaneously performing joint tracking and seam inspection of a joint. The method comprises the steps of:

providing a joining head in relative motion along the joint and having a joining laser beam directed towards the joint along a joining laser optical path;

projecting a tracking laser line transversally intersecting the joint closely frontwards the joining laser beam with respect to the relative motion to generate successive joint transverse profiles;

projecting an inspection laser line transversally intersecting the joint closely backwards the joining laser beam with respect to the relative motion to generate successive seam transverse profiles;

imaging each of the joint transverse profiles and each of the seam transverse profiles coaxially through the joining laser optical path; and processing the joint profiles and the seam profiles to respectively provide joint data and seam data, thereby allowing to perform the joint tracking and the seam inspection of the joint during the motion.

In a further preferred embodiment, the laser joining method can also further comprise the steps of:

imaging a process area of the joint extending between the laser lines for providing process area images; and processing the process area images for allowing adaptive process control of the joining laser beam.

In another further preferred embodiment, the step of processing the joint profiles and the seam profiles comprises the sub-step of measuring a depth profile along each of the laser lines for providing geometric data about the joint.

In another preferred embodiment, the laser joining method can also further comprise the steps of:

monitoring continuously position of the joining head relatively to the joint; and positioning continuously the joining head relatively to the joint along a focusing Z-axis and a lateral Y-axis.

In another further preferred embodiment, the laser joining method can also further comprise the step of translating one of the laser line on an intersection of the joining laser beam with the joint for providing position of the laser beam with respect to an imaging means.

In another further preferred embodiment, the laser joining method can also further comprise the step of projecting the joining laser beam on the joint at low power to provide the focal point position of the joining laser beam.

In another further preferred embodiment, the laser joining method can also further comprise the step of synchronously rotating each of the laser lines around the joining laser beam for allowing joint tracking and seam inspection of a small radius joint.

In yet another further preferred embodiment, the laser joining method can also further comprise the steps of:

providing a filler wire; and controlling an inflow of the filler wire according to the seam data, thereby allowing a real time adaptive joining.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A laser joining head assembly for simultaneously performing joint tracking and seam inspection of a joint while said joining head assembly is in relative motion along said joint, said laser joining head assembly comprising:
   a joining laser beam directed towards said joint along a joining laser optical path;
   integrated tracking laser line projecting means having an optical axis precisely angularly directed towards said joint closely upstream said joining laser beam with respect to said relative motion for projecting a tracking laser line transversally intersecting said joint, thereby generating successive joint transverse profiles;
   integrated inspection laser line projecting means having an optical axis precisely angularly directed towards said joint closely downstream said joining laser beam with respect to said relative motion for projecting an inspection laser line transversally intersecting said joint, thereby generating successive seam transverse profiles;
   imaging means mounted coaxially to said joining laser beam for successively imaging each of said joint transverse profiles and each of said seam transverse profiles coaxially through said joining laser optical path during said motion; and
   processing means operatively connected to said imaging means for processing said joint profiles and said seam profiles to respectively provide joint data and seam data;
   monitoring and control means for monitoring and controlling the position of said laser beam relative to said joint with the help of the processing means, thereby performing said joint tracking and said seam inspection of said joint during said motion; and
   robot position error monitoring and compensating means for monitoring and compensating robot position error of said joining head assembly.

2. The laser joining head assembly according to claim 1, wherein said imaging means comprise a tracking 2D-imager for imaging said joint transverse profiles and an inspection 2D-imager for imaging said seam transverse profiles.

3. The laser joining head assembly according to claim 2, wherein each of said 2D-imagers comprises a CMOS sensor.

4. The laser joining head assembly according to claim 2, wherein said imaging means further comprises a process 2D-imager for imaging a process area of said joint extending between said laser lines.

5. The laser joining head assembly according to claim 1, wherein said imaging means comprise a 2D-imager for imaging a process area of said joint surrounding said joint transverse profile and said seam transverse profile within a single image.

6. The laser joining head assembly according to claim 1, wherein each of said tracking laser line projecting means and said inspection laser line projecting means is symmetrically arranged with respect to said joining laser beam for projecting each one of said laser lines in a symmetric relationship with respect to said joining laser beam.

7. The laser joining head assembly according to claim 1, wherein said tracking projecting means comprise a solid state laser diode emitting red light, and said inspection projecting means comprise a solid state laser diode emitting infra-red light.

8. The laser joining head assembly according to claim 1, wherein said processing means comprise a real time electronic processor.

9. The laser joining head assembly according to claim 1, wherein said processing means comprise measuring means for measuring a depth profile along each of said laser lines for providing geometric data about said joint.

10. The laser joining head assembly according to claim 1, wherein said monitoring and control means comprise adaptive process control means.

11. The laser joining head assembly according to claim 10, further comprising positioning means for continuously positioning said head assembly and said joint relatively to each other along a focusing Z-axis and a lateral Y-axis.

12. The laser joining head assembly according to claim 11, wherein said positioning means comprise a Y-actuator and a Z-actuator.

13. The laser joining head assembly according to claim 12, wherein each of said actuators is a linear actuator.

14. The laser joining head assembly according to claim 1, further comprising rotating means for each of said laser line projecting means for synchronously rotating each of said projecting means with each other around said joining laser beam.

15. The laser joining head assembly according to claim 14, wherein said imaging means are mounted to said rotating means for rotating said imaging means synchronously with each of said projecting means.

16. The laser joining head assembly according to claim 15, wherein said rotating means comprise a single motor and first and second timing belts, each of said belts being synchronously driven by said motor for respectively rotating said imaging system and said projecting means together.

17. The laser joining head assembly according to claim 1, further comprising a fiber coupling means extending perpendicularly with respect to said joining laser optical path.

18. The laser joining head assembly according to claim 17, wherein said fiber coupling means comprises a semi reflective mirror angularly disposed in said joining laser optical path.

19. The laser joining head assembly according to claim 1, further comprising a fiber coupling means extending in a parallel relationship to said joining laser optical path.

20. The laser joining head assembly according to claim 19, wherein said fiber coupling means comprise a first and a second semi-reflective mirror, the first mirror being angularly disposed in said joining laser optical path.

21. The laser joining head assembly according to claim 1, further comprising a casing for mounting each of said projecting means and said imaging system integrated with each other.

22. The laser joining head assembly according to claim 21, being further provided with protecting means mountable in said casing and comprising a main protective lens coaxially disposed along the laser beam axis and first and second protective lenses respectively disposed along the optical axis of a corresponding one of said projecting means.

23. The laser joining head assembly according to claim 22, wherein said protecting means further comprise a removable sliding cartridge for securely receiving each of said protective lenses.

24. The laser joining head assembly according to claim 22, wherein said protecting means further comprise a main removable sliding cartridge for securely receiving the main protective lens and an additional removable sliding cartridge for securely receiving each of said first and second protective lenses.

25. The laser joining head assembly according to claim 24, wherein said protecting means further comprise a positive pressure generator for generating a positive pressure in front of each of said lenses.

26. The laser joining head assembly according to claim 1, wherein said joining head is a welding head.

27. The laser joining head assembly according to claim 26, wherein said welding head is provided with a filler wire.

28. The laser joining head assembly according to claim 27, wherein said processing means comprise a filler wire controlling means for controlling an inflow of said filler wire according to said data, thereby providing real time adaptive welding.

29. The laser joining head assembly according to claim 26, wherein said welding head is provided with a filler powder.

30. The laser joining head assembly according to claim 29, wherein said processing means comprise a filler powder controlling means for controlling an inflow of said filler powder according to said data, thereby providing real time adaptive welding.

31. The laser joining head assembly according to claim 1, wherein said joining head is a brazing head provided with a filler wire.

32. The laser joining head assembly according to claim 31, wherein said processing means comprise a filler wire controlling means for controlling an inflow of said filler wire according to said data, thereby providing a real time adaptive brazing.

33. The laser joining head assembly according to claim 1, wherein said robot position error monitoring and compensating means comprise laser line translating means for translating one of said laser line on an intersection of the joining laser beams with the joint, thereby monitoring said robot position error with the help of the processing means.

34. The laser joining head assembly according to claim 33, wherein said laser line translating means comprise a slide.

35. The laser joining head assembly according to claim 1, wherein said robot position error monitoring and compensating means is operatively connected to said monitoring and control means for compensating said robot position error.

36. A laser joining method for simultaneously performing joint tracking and seam inspection of a joint, said method comprising the steps of:
    providing a joining head in relative motion along said joint and having a joining laser beam directed towards said joint along a joining laser optical path;
    projecting a tracking laser line transversally intersecting said joint closely upstream said joining laser beam with respect to said relative motion to generate successive joint transverse profiles;
    projecting an inspection laser line transversally intersecting said joint closely downstream said joining laser beam with respect to said relative motion to generate successive seam transverse profiles;
    imaging each of said joint transverse profiles and each of said seam transverse profiles coaxially through said joining laser optical path;
    monitoring and compensating robot position error of said joining head assembly;
    processing said joint profiles and said seam profiles to respectively provide joint data and seam data; and
    controlling the position of said laser beam relative to said joint during said motion, thereby performing said joint tracking and said scan inspection of said joint.

37. The laser joining method according to claim 36, further comprising the steps of:
    imaging a process area of said joint extending between said laser lines for providing process area images; and
    processing said process area images for allowing adaptive process control of said joining laser beam.

38. The laser joining method according to claim 36, wherein said step of processing said joint profiles and said seam profiles comprises the sub-step of measuring a depth profile along each of said laser lines for providing geometric data about said joint.

39. The laser joining method according to claim 36, further comprising the steps of:
    continuously monitoring the position of said joining head relative to said joint; and
    continuously positioning said joining head relative to said joint along a focusing Z-axis and a lateral Y-axis.

40. The laser joining method according to claim 36, further comprising the step of synchronously rotating each of said laser lines around said joining laser beam for performing joint tracking and seam inspection of a small radius joint.

41. The laser joining method according to claim 36, further comprising the steps of:
    providing a filler wire; and
    controlling an inflow of said filler wire according to said seam data, thereby allowing a real time adaptive joining.

42. The laser joining method according to claim 36, further comprising the steps of:
    providing a filler powder; and
    controlling an inflow of said filler powder according to said seam data, thereby allowing a real time adaptive joining.

43. The laser joining method according to claim 36, wherein said step of monitoring and compensating said robot position error comprises the sub-step of translating one of said laser line on an intersection of the joining laser beam with the joint for providing a position of said laser beam with respect to said joint.

44. The laser joining method according to claim 36, further comprising the step of projecting said joining laser beam on said joint at low power to provide a focal point position of said joining laser beam.

* * * * *